(12) United States Patent
Ge et al.

(10) Patent No.: US 11,335,074 B2
(45) Date of Patent: May 17, 2022

(54) ARRANGEMENT DETERMINATION FOR 3D FABRICATED PARTS

(71) Applicant: Hewlett-Packard Development Company, L.P., Spring, TX (US)

(72) Inventors: Ning Ge, Palo Alto, CA (US); Steven J. Simske, Fort Collins, CO (US); Chandrakant Patel, Palo Alto, CA (US); Jun Zeng, Palo Alto, CA (US); Paul J. Benning, Corvallis, OR (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 411 days.

(21) Appl. No.: 16/345,853

(22) PCT Filed: Dec. 19, 2016

(86) PCT No.: PCT/US2016/067527
§ 371 (c)(1),
(2) Date: Apr. 29, 2019

(87) PCT Pub. No.: WO2018/118009
PCT Pub. Date: Jun. 28, 2018

(65) Prior Publication Data
US 2020/0193716 A1 Jun. 18, 2020

(51) Int. Cl.
*G05B 19/4099* (2006.01)
*G06T 19/20* (2011.01)
(Continued)

(52) U.S. Cl.
CPC ............ *G06T 19/20* (2013.01); *B29C 64/147* (2017.08); *B29C 64/386* (2017.08); *G05B 19/4099* (2013.01); *G06T 17/05* (2013.01)

(58) Field of Classification Search
CPC ........ G06T 19/20; G06T 17/05; B29C 64/147; B29C 64/386; G05B 19/4099; G06F 30/00; G06F 30/398
See application file for complete search history.

(56) References Cited

U.S. PATENT DOCUMENTS 5,352,405 A 10/1994 Beaman et al.
8,691,333 B2 4/2014 Godfrey et al.
(Continued)

FOREIGN PATENT DOCUMENTS

EP 2779116 9/2014

OTHER PUBLICATIONS

J. T. Klosowski, M. Held, J. S. B. Mitchell, H. Sowizral and K. Zikan, "Efficient collision detection using bounding volume hierarchies of k-DOPs," in IEEE Transactions on Visualization and Computer Graphics, vol. 4, No. 1, pp. 21-36, Jan.-Mar. 1998 (Year: 1998).*

(Continued)

*Primary Examiner* — Rocio Del Mar Perez-Velez
*Assistant Examiner* — Alicia M. Choi
(74) *Attorney, Agent, or Firm* — Mannava & Kang

(57) ABSTRACT

According to an example, an apparatus may include a memory that may store instructions to cause a processor to generate, for each part to be fabricated in a build envelope of a 3D fabricating device, first level descriptions and second level descriptions for the part. The processor may determine, using the first level descriptions, whether there is an arrangement that results in the parts jointly fitting within the build envelope while providing certain thermal decoupling spaces between the parts. In response to a determination that the arrangement using the first level descriptions for the parts has not been determined, the processor may determine, using the second level descriptions, whether there is
(Continued)

an arrangement that results in the parts jointly fitting within the build envelope while providing the certain thermal decoupling spaces.

15 Claims, 3 Drawing Sheets

(51) Int. Cl.
    *B29C 64/147* (2017.01)
    *G06T 17/05* (2011.01)
    *B29C 64/386* (2017.01)

(56) References Cited

U.S. PATENT DOCUMENTS

| | | | | |
|---|---|---|---|---|
| 2012/0154399 | A1* | 6/2012 | Munkberg | G06T 17/20 |
| | | | | 345/423 |
| 2013/0089642 | A1 | 4/2013 | Lipson et al. | |
| 2014/0039847 | A1* | 2/2014 | Georgescu | G06F 30/15 |
| | | | | 703/1 |
| 2014/0081603 | A1* | 3/2014 | Griffith | G06F 30/20 |
| | | | | 703/1 |
| 2015/0243039 | A1 | 8/2015 | Holz | |
| 2015/0293525 | A1* | 10/2015 | Yamamoto | G05B 19/41805 |
| | | | | 702/182 |
| 2016/0067920 | A1 | 3/2016 | Fontaine | |
| 2016/0210088 | A1* | 7/2016 | Van Den Branden | G06F 3/125 |
| 2017/0176977 | A1* | 6/2017 | Huang | G05B 19/4099 |
| 2017/0252978 | A1* | 9/2017 | Claes | G05B 19/4099 |
| 2018/0024517 | A1* | 1/2018 | Halperin | G05B 19/4099 |
| | | | | 700/98 |
| 2018/0099454 | A1* | 4/2018 | Hummeler | B33Y 10/00 |

OTHER PUBLICATIONS

Cagan J et al; A simulated annealing-based algorithm using hierarchical models for general three-dimensional component layout; Computer Aided Design, Elsevier Publishers BV., Barking GB, vol. 30, No. 10, Sep. 1998, pp. 781-790.
E. Lutters et al; 3D Nesting of complex shapes; Procedia Cirp, vol. 3, No. 1, Dec. 2012, pp. 26-31.
Ilkka Ikonen et al; Concept for a genetic algorithm for packing three dimensional objects of complex shape; Sep. 30, 1996.
John Dickinson et al; Packing subsets 1-15 of 3D parts for layered manufacturing; International Journal of Smart Engineering System Design; vol. 4. No. 3, 2002, pp. 147-161.
Sung-Min Hur et al; Determination of fabricating orientation and packing in SLS process; Journal of Materials Processing Technology, Elsevier, NL, vol. 112, No. 2-3, May 25, 2001, pp. 236-243.
Yicha Zhang et al; Two-dimensional placement optimization for multi-parts production in additive manufacturing; Robotics and Computer Integrated Manufacturing; vol. 38, Apr. 2016, pp. 102-117.
4-headed Printer Makes Multiple Parts Simultaneously, Feb. 25, 2015, http://makezine.com/2015/02/25/4-headed-printer-makes-multiple-parts-simultaneously/ >.
IPF Amazes Customers with High-quality, Multi-material Prototypes Printed on Objet 3d Printers , Jan. 10, 2012, < http://investors.stratasys.com/releasedetail.cfm?releaseid=705891 >.

* cited by examiner

ARRANGEMENT DETERMINATION FOR 3D FABRICATED PARTS

BACKGROUND

Some 3D manufacturing apparatuses employ additive manufacturing techniques to build or print parts within a 3D build envelope of the 3D manufacturing apparatus. As individual parts typically do not use the entire 3D build envelope, 3D manufacturing apparatuses are often operated to build multiple distinct parts within the build envelope concurrently during a common build operation.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
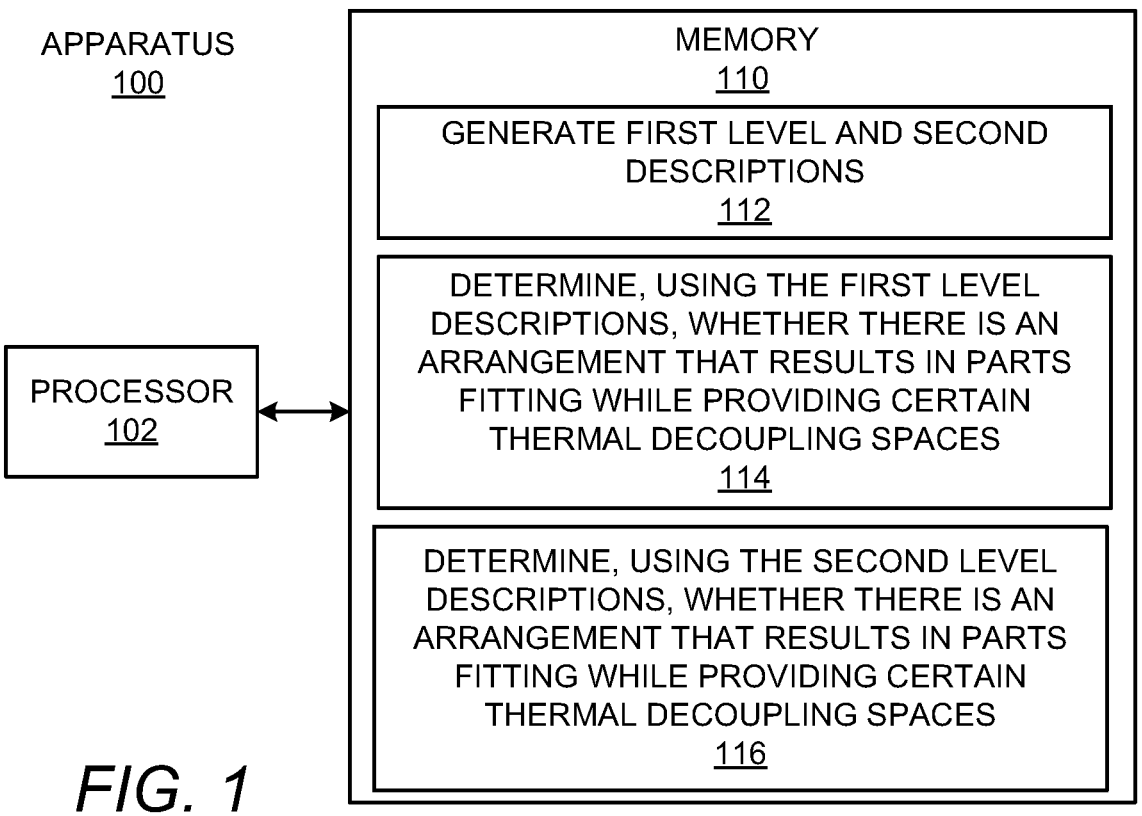
FIG. 1 shows a simplified block diagram of an example apparatus.

In order to maximize throughput and yield optimization, a maximum number of parts may be fabricated jointly or concurrently within a build envelope (or equivalently, build volume) of a three-dimensional (3D) fabricating device. The maximum number of parts may be the largest number of parts that may be fabricated within the build envelope of the 3D fabricating device during a single fabrication operation. A single fabrication operation may include an operation in which the parts are fabricated in the build envelope without removing any of the fabricated parts. Considered another way, the throughput may be maximized and yield may be optimized when the parts occupy a maximum amount of volume in the build envelope.

In some additive 3D manufacturing processes, such as in the multi-jet fusion fabricating process as well as in other types of fabricating processes, heat is applied to build material particles located in selected areas such that those selectively located build material particles melt and fuse together to form a section of a 3D fabricated part. Some of the applied heat may bleed out to other build material particles that are outside of, e.g., adjacent to, the build material particles located in the selected areas. This so-called "thermal bleeding" may cause problems in sections of parts formed from other build material particles that receive the excess heat. For instance, those build material particles that receive more heat than intended may become over-fused, which may result in poor quality sections or parts.

Disclosed herein are methods and apparatuses for determining an arrangement of parts to be fabricated in a build envelope of a 3D fabricating device. Particularly, the determined arrangement may be an arrangement that optimizes, e.g., maximizes, the number of parts to be fabricated jointly or concurrently in the build envelope of the 3D fabricating device while compensating for thermal energy management concerns, such as energy imbalance and thermal coupling (cross-talk) effects between the parts. The arrangement of parts may include the placements and orientations of the parts. In one regard, through implementation of the methods and apparatuses disclosed herein, thermal energy management concerns regarding the parts may be addressed while an arrangement of the parts may be determined that may result in an optimized packing and high quality fabrication of the parts. The arrangement of parts to address the thermal energy management concerns may include preferentially avoiding certain locations within the build envelope where, for example, thermal effects are not desirable. For instance, certain locations having thermal effects that are non-uniform, unpredictable, and/or deleterious to the quality of the parts may be avoided. Avoiding those certain locations may result, for instance, in reduced material recycles due to degrading of the build materials due to over-heating of the build materials.

According to examples, multiple levels of descriptions (or equivalently, descriptors) for the parts may be determined, in which each level of description may correspond to a different level of complexity. By way of example, four levels of descriptions for the parts may be determined. In this example, first level descriptions may each be a description of a cuboid bounding box of a respective part, second level descriptions may each be a description of an ellipsoid convex hull of a respective part, third level descriptions may each be a description of a smoothed version of a computer aided design of a respective part, and fourth level descriptions may each be a description of an original computer aided design of a respective part. The amount of data contained in the descriptions may increase with the increasing levels and thus, the complexities of the descriptions may also increase with the increasing levels of the descriptions.

Particularly, the first level descriptions may be relatively less complex than the second level descriptions, the second level descriptions may be relatively less complex than the third level descriptions, and the third level descriptions may be relatively less complex than the fourth level descriptions. Accordingly, the computational resources, e.g., time, energy, etc., associated with performing calculations using these descriptions may increase with the increasing levels of the descriptions. As discussed herein, the calculations may be performed using the descriptions to determine an arrangement of the parts in the build envelope of the 3D fabricating device that maximizes the number of parts while maintaining gaps between the parts that meet respective thermal decoupling spaces between the parts. Performance of the calculations may include the implementation of an optimization algorithm to determine whether the parts fit within the build envelope while maintaining sufficient gaps that provide the respective thermal decoupling spaces.

According to examples, the first level descriptions may initially be used in the implementation of the optimization algorithm to make a determination as to whether the parts fit concurrently within the build envelope while meeting the respective thermal decoupling spaces between the parts. The respective thermal decoupling spaces may be determined, for instance, through modeling of the thermal dissipation properties of the parts in the coordinate axes of the build envelope. The models of the thermal dissipation properties may be used to determine the minimum distances, e.g., the thermal decoupling spaces, required between the parts to maintain thermal coupling (cross-talk) effects between the parts below a certain threshold level. The certain threshold level may be determined through testing, modeling, user-defined, or the like.

If the use of the first level descriptions results in a successful packing, e.g., all of the parts being included in the build envelope while maintaining the respective thermal decoupling spaces between the parts, the arrangement of parts determined through use of the first level descriptions may be identified as a suitable arrangement for the parts. However, if the use of the first level descriptions in the implementation of the optimization algorithm does not result in a successful packing, the second level descriptions may be used. If the use of the second level descriptions results in a successful packing, the arrangement of parts determined through use of the second level descriptions may be identified as a suitable arrangement for the parts. However, if the use of the second level descriptions in the implementation of the optimization algorithm does not result in a successful packing, the third level descriptions may be used. Similar operations may be performed for the third and fourth level descriptions. If the use of the fourth level descriptions does not result in a successful packing, a part or multiple parts may be removed to reduce a number of parts to be fabricated concurrently in the build envelope, i.e., during a common fabrication operation.

Through implementation of the methods and apparatuses disclosed herein, a packing arrangement that may maximize the number of parts to be fabricated in a build envelope during a common fabrication operation while meeting thermal management requirements may be determined. In addition, a least computationally intensive, and thus a least time consuming, operation may be implemented prior to implementing more computationally intensive and thus more time consuming operations to make this determination. Accordingly, the more computationally intensive operations may be avoided when possible, which may result in the arrangement determination being made in a relatively quick and efficient manner, thus reducing consumption of computing resources.

Before continuing, it is noted that as used herein, the terms "includes" and "including" mean, but are not limited to, "includes" or "including" and "includes at least" or "including at least." The term "based on" means, but is not limited to, "based on" and "based at least in part on."

With reference first to FIG. 1, there is shown a simplified block diagram of an example apparatus 100. The apparatus 100 may include a processor 102 that may control operations of the apparatus 100 and may be a semiconductor-based microprocessor, a central processing unit (CPU), an application specific integrated circuit (ASIC), field-programmable gate array (FPGA), and/or other hardware device. The apparatus 100 may also include a memory 110 that may have stored thereon machine readable instructions 112-116 (which may also be termed computer readable instructions) that the processor 102 may execute. The memory 110 may be an electronic, magnetic, optical, or other physical storage device that contains or stores executable instructions. The memory 110 may be, for example, Random Access Memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The apparatus 100 may be a computing device such as a personal computer, a laptop computer, a smartphone, a server computer, a tablet computer, or the like. In other examples, the apparatus 100 may form part of a 3D fabricating device. The processor 102 may communicate instructions to the 3D fabricating device over a network, through a wired connection, a bus, or the like. The 3D fabricating device may include various components for fabricating parts; for instance, a spreader to spread build material particles into respective layers, a delivery device to deliver a fusing agent to selected areas of the respective layers, a fusing energy source, etc.

Figure 2:
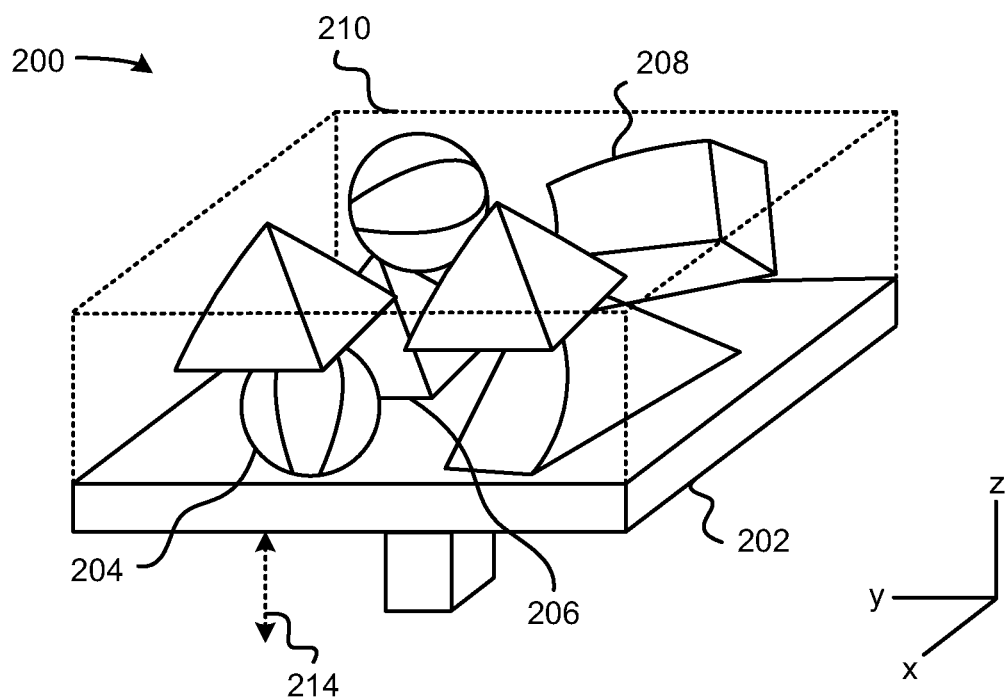
FIG. 2 shows a simplified diagram of a portion of an example 3D fabricating device with which the example apparatus depicted in FIG. 1 may communicate or of which the example apparatus depicted in FIG. 1 may be a part.

Various elements of the apparatus 100 are described herein with respect to FIG. 2, which depicts a simplified diagram of a portion of an example 3D fabricating device 200 with which the example apparatus 100 may communicate or of which the apparatus 100 may be a part. As shown in FIG. 2, the 3D fabricating device 200 may include a build area platform 202 that includes a build area surface on which 3D objects or parts 204-208 (only three of the 3D parts are labeled with reference numerals for purposes of simplicity) are to be generated from a build material, such as build material particles (not shown). The build material particles may be micron-sized particles of material, e.g., plastic, ceramic, metal, or the like, that may be fused together to build the 3D parts. Particularly, the 3D parts 204-208 are to be generated within a build envelope 210, which is equivalently referenced herein as a build volume. The build envelope 210 may occupy a three-dimensional space on top of the build area surface of the build area platform 202.

For instance, the build envelope 210 may be defined as the three-dimensional space in which the 3D fabricating device 200 may fabricate or otherwise generate the parts 204-208. The width and the length of the build envelope 210 may be limited by the width and the length of the build area platform 202 and the height of the build envelope 210 may be limited by the extent to which the build area platform 202 may be moved in the z direction, in which movement of the build area platform 202 is represented by the arrow 214. Although not shown, an actuator, such as a piston, may control the vertical position of the build area platform 202.

The 3D fabricating device 200 may fabricate the multiple parts 204-208 jointly, e.g., during a single building operation within the build envelope 210. As disclosed herein, the apparatus 100, and particularly the processor 102 may determine an arrangement of the parts 204-208 to be fabricated in the build envelope 210 that may result in a maximized number of parts 204-208 being printed during a common printing operation while also providing sufficient spaces between the parts 204-208 to limit thermal coupling between the parts to certain levels, e.g., below predefined levels. The processor 102 may also determine the arrangement of the parts 204-208 to preferentially avoid certain locations in the build envelope 210 at which thermal effects may not be desirable, e.g., non-uniform heat distribution, unpredictable thermal effects, etc.

For instance, the parts 204-208 may be arranged in the build envelope 210 such that heat emanating from portions of the parts 204-208 during fabrication of the parts 204-208 does not adversely affect neighboring parts 204-208 beyond some predefined level, e.g., an acceptable level that enables that parts to be fabricated to have at least a certain level of quality. In this regard, and as discussed in greater detail herein, thermal interactions between the parts 204-208 that may occur during fabrication of the parts 204-208 are taken into consideration in determining the arrangement of the parts 204-208. The arrangement of the parts 204-208 may include the placements of the parts in the x, y, and z directions as well as rotations of the parts, e.g., yaw, roll, and pitch, that result in the maximized number of parts being fabricated during a single fabrication operation while providing the certain thermal decoupling spaces between the parts. It should be noted that the parts 204-208 may be fabricated at any orientation/rotation within the build envelope 210, for instance, to maximize the number of parts being fabricated while providing the certain thermal decoupling spaces between the parts.

It should be clearly understood that the 3D fabricating device 200 depicted in FIG. 2 may have any of a plurality of different configurations and may use any of a number of different additive manufacturing techniques to build or print the parts 204-208. For instance, the 3D fabricating device 200 may employ any of multi-jet fusion, selective laser sintering, selective laser melting, stereolithography, etc. Thus, for instance, the 3D fabricating device 200 may use various types of materials, e.g., power-based, liquid-based, etc., in the fabrication of the parts 204-208.

With reference to FIGS. 1 and 2, the processor 102 may fetch, decode, and execute the instructions 112 to generate, for each of a plurality of parts 204-208 to be fabricated concurrently in a build envelope 210 of a 3D fabricating device 200, first level descriptions and second level descriptions for the parts. The first level descriptions may be less complex than the second level descriptions for the same parts 204-208. For instance, the first level description for a first part 204 may be relatively less complex than the second level description for the first part 204. The complexities of the descriptions may correspond to the amount of data used to describe the parts 204-208. By way of example, a more complex description of a part 204 may describe a larger number of points, a larger number of edges, a larger number of surfaces, and the like, for the part 204 as compared with a less complex description of the part 204.

According to an example, the first level descriptions may each be a description of a cuboid bounding box of a respective part and thus, may include information pertaining to the corners of the cuboid bounding box. The cuboid bounding box of a part may be defined as a box that is sufficiently large to bound the part. The second level descriptions may each be a description of an ellipsoid convex hull (or equivalently, an ellipsoid 3D convex hull) of a respective part. The ellipsoid convex hull of a part may be defined as a smallest convex set of points that contains the part. In other words, the ellipsoid convex hull of a part may be defined as the intersection of all convex sets containing the part. As descriptions of the ellipsoid convex halls of the parts may have more data points than the descriptions of the cuboid bounding boxes for the parts, the second level descriptions may be relatively more complex than the first level descriptions for the respective parts.

According to an example, the ellipsoid convex hull of a part may be described by the following equation:

$$\frac{x^2}{a^2} + \frac{y^2}{b^2} + \frac{z^2}{c^2} = 1. \qquad \text{Equation (1)}$$

In Equation (1), "x, y, and z" are Cartesian coordinates of the part and "a, b, and c" are the semi-principle axes along the Cartesian coordinates. However, if the ellipsoid convex hull is not centered at the origin, the ellipsoid convex hull may be described by the following equation:

$$\frac{(x-x_0)^2}{a^2} + \frac{(y-y_0)^2}{b^2} + \frac{(z-z_0)^2}{c^2} = 1. \qquad \text{Equation (2)}$$

In Equation (2), "x0, y0, z0" are the coordinates of the centroid of the ellipsoid. Additionally, an ellipsoid convex hull that is oriented arbitrarily, centered at point p, may be defined by the solutions x to the following equation:

$$(x-p)^T A(x-p)=1. \qquad \text{Equation (3):}$$

In Equation (3), A may be a positive definite matrix and x and p may be vectors, and the eigenvectors of A may define the principal axes of the ellipsoid and the eigenvalues of A are the reciprocals of the squares of the semi-axes.

In addition or in other examples, and as discussed in greater detail herein, the processor 102 may execute the instructions 112 to generate additional level descriptions for each of the parts 204-208. For instance, the processor 102 may generate third level descriptions and fourth level descriptions for each of the parts 204-208, in which the fourth level descriptions are more complex than the third level descriptions and the third level descriptions are more complex than the second level descriptions for the respective parts. The third level descriptions may each be a description of a smoothed version of a computer aided design of a respective part. The fourth level descriptions may each be a description of an original computer aided design of a respective part. Thus, for instance, the fourth level descriptions may have the highest level of detail regarding the parts. The computer aided design of a respective part may be defined as a digital description that may include all of the shape, volume, and other dimensional information of the part. The computer aided design may also include other information such as the materials used, the colors included in the part, and the like.

The amount of data contained in the descriptions may thus increase with the increasing description levels and thus, the complexities of the descriptions may also increase with the increasing levels of the descriptions. In one regard, the amount of computational resources required in performing computational processes using the descriptions may further increase with the increased complexities of the descriptions. That is, use of the first level descriptions may be relatively less computationally intense than use of the higher-level descriptions in determining the suitable arrangement of the parts 204-208. Thus, determination of the suitable arrangement using lower level descriptions may require less computational resources and less time than determination of the suitable arrangement using higher level descriptions.

As discussed herein, the processor 102 may perform a recursive process using the multiple levels of descriptions for the parts 204-208 beginning with the lowest level descriptions, i.e., the least complex descriptions, of the parts 204-208. In this regard, the processor 102 may use the more complex descriptions when use of the lesser complexity descriptions does not result in a packing arrangement of the parts 204-208 that meets the above-defined criteria being determined. As such, the processor 102 may fetch, decode, and execute the instructions 114 to initially determine, using the first level descriptions, whether there is an arrangement of the parts 204-208 that results in the parts fitting within the build envelope 210 while providing certain thermal decoupling spaces between the parts 204-208.

The processor 102 may implement an optimization operation to determine, using the first level descriptions, whether there is an arrangement of the parts 204-208 that results in the parts 204-208 fitting jointly within the build envelope 210 while providing certain thermal decoupling spaces between the parts 204-208. The determination of the arrangement may also include preferentially avoiding certain locations in the build envelope 210 as discussed herein. The optimization operation may include determining whether there is an arrangement of the cuboid bounding boxes of the parts 204-208 that results in each of the parts 204-208 fitting within the build envelope 210 with the parts 204-208 being spaced apart from each other with sufficient distances to provide the certain thermal decoupling spaces. This may include determining whether such an arrangement exists with variously positioned and oriented versions of the cuboid bounding boxes, i.e., parts 204-208.

By way example, the processor 102 may implement a genetic algorithm to fit the cuboid bounding boxes in the build envelope 210. In this example, the processor 102 may space the cuboid bounding boxes apart from each other based upon a minimum thermal distance required to prevent thermal bleeding beyond a predefined level from occurring between the parts 204-208. The minimum thermal distances between the parts 204-208 may be determined through determination of thermal profiles of the parts 204-208, in which the thermal profiles may indicate the amount of heat to be absorbed along portions of the parts 204-208 and thus the amount of thermal bleeding that may occur from the parts 204-208 in three dimensions. The thermal profiles of the parts 204-208 may be determined through implementation of any suitable thermal profile determination operation. According to an example, the processor 102 may package the parts 204-208 in the build envelope 210 such that the parts 204-208 are distributed within the build envelope 210 to minimize the thermal interaction of part to part. In order to optimize the arrangement of the parts 204-208, the thermal dissipation properties in the coordinate axes of the volume, e.g., $\{x,y,z\}$, $\{r,\theta,z\}$, or $\{p,\theta,\phi\}$, may be modeled appropriately. For example, if the heat is dissipated proportionately in each of the Cartesian directions—$\{x,y,z\}$—then a penalty for proximity may be proportional to $1/(distance)^3$.

In any regard, the processor 102 may identify the order of the parts 204-208 placed into the build envelope 210 as the genetic code of the genetic algorithm. In addition, the processor 102 may unwrap the order of the parts 204-208 along the x-axis first, then the y-axis, and then the z-axis. That is, the processor 102 may continue adding parts in the x-axis until a next part cannot be added, then shift to the next row in the y-axis until a first plane is filled, then may increment to the z-axis. The processor 102 may mutate the genetic algorithm by rotating the parts 204-208, e.g., switching the x, y, z directions of a cuboid bounding box, and by swapping two parts in areas of low density, e.g., early termination in the x, y, or z direction. Goodness of fit (and proportional propagation into the next generation of the genetic algorithm) may be determined in inverse proportion to the overall density of the set of parts 204-208. In any regard, the genetic algorithm may be based on the genetic algorithm described in "Navigation Using Inverting Genetic Algorithms: Initial Conditions and Node-Node Transitions" by Steven J. Simske et al., the disclosure of which is hereby reference in its entirety. In other examples, other optimization algorithms may be employed, such as simulated annealing, particle swarm optimization, and other meta-heuristic algorithms.

In response to a determination that the arrangement of the parts 204-208 that results in the parts fitting concurrently within the build envelope 210 while providing the certain thermal decoupling spaces between the parts 204-208 using the first level descriptions for the parts 204-208 has been determined, the processor 102 may determine the arrangement of the parts 204-208 to be the determined arrangement of the parts 204-208. Thus, for instance, the processor 102 may store the determined arrangement, may forward the determined arrangement to a 3D fabricating device, may control a 3D fabricating device to fabricate the parts 204-208 in the determined arrangement, and the like.

However, in response to a determination that the arrangement of the parts 204-208 that results in the parts 204-208 fitting concurrently within the build envelope 210 while providing the certain thermal decoupling spaces between the parts 204-208 using the first level descriptions for the parts 204-208 has not been determined, the processor 102 may fetch, decode, and execute the instructions 116. Particularly, the processor 102 may execute the instructions 116 to determine, using the second level descriptions, whether there is an arrangement of the parts 204-208 that results in the parts 204-208 fitting concurrently within the build envelope 210 while providing the certain thermal decoupling spaces between the parts 204-208.

The processor 102 may implement an optimization operation to determine, using the second level descriptions, whether there is an arrangement of the parts 204-208 that results in the parts 204-208 fitting concurrently within the build envelope 210 while providing the certain thermal decoupling spaces between the parts 204-208. The optimization operation may include determining whether there is an arrangement of the ellipsoid convex hulls of the parts 204-208 that results in each of the parts 204-208 fitting jointly within the build envelope 210 with the parts 204-208 being spaced apart from each other with sufficient distances to provide the certain thermal decoupling spaces. This may include determining whether such an arrangement exists with variously positioned and oriented versions of the ellipsoid convex hulls, i.e., parts 204-208.

By way example, the processor 102 may implement a genetic algorithm to fit the ellipsoid convex hulls of the parts 204-208 in the build envelope 210. In this example, the processor 102 may space the ellipsoid convex hulls apart from each other based upon a minimum thermal distance required to prevent thermal bleeding beyond a predefined level from occurring between the parts 204-208. The minimum thermal distances between the parts 204-208 may be determined as discussed above.

In any regard, the processor 102 may identify the order of the parts 204-208 placed into the build envelope 210 as the genetic code of the genetic algorithm. In addition, the processor 102 may unwrap the order of the parts 204-208 along the x-axis first, then the y-axis, and then the z-axis. That is, the processor 102 may continue adding parts in the x-axis until a next part cannot be added, then shift to the next row in the y-axis until a first plane is filled, then may increment to the z-axis. The processor 102 may mutate the genetic algorithm by rotating the parts 204-208, e.g., switching the x, y, z directions of an ellipsoid convex hull, and by swapping two parts in areas of low density, e.g., early termination in the x, y, or z direction. Goodness of fit (and proportional propagation into the next generation of the genetic algorithm) may be determined in inverse proportion to the overall density of the set of parts 204-208. In any regard, the genetic algorithm may be based on the genetic algorithm discussed above.

In response to a determination that the arrangement of the parts 204-208 that results in the parts fitting within the build envelope 210 while providing the certain thermal decoupling spaces between the parts 204-208 using the second level descriptions for the parts 204-208 has been determined, the processor 102 may determine the arrangement of the parts 204-208 to be the determined arrangement of the parts 204-208. Thus, for instance, the processor 102 may store the determined arrangement, may forward the determined arrangement to a 3D fabricating device, may control a 3D fabricating device to fabricate the parts 204-208 in the determined arrangement, and the like. Various additional operations that may be performed following a determination that such an arrangement has not been determined through use of the second level descriptions are provided elsewhere herein.

Figure 3:
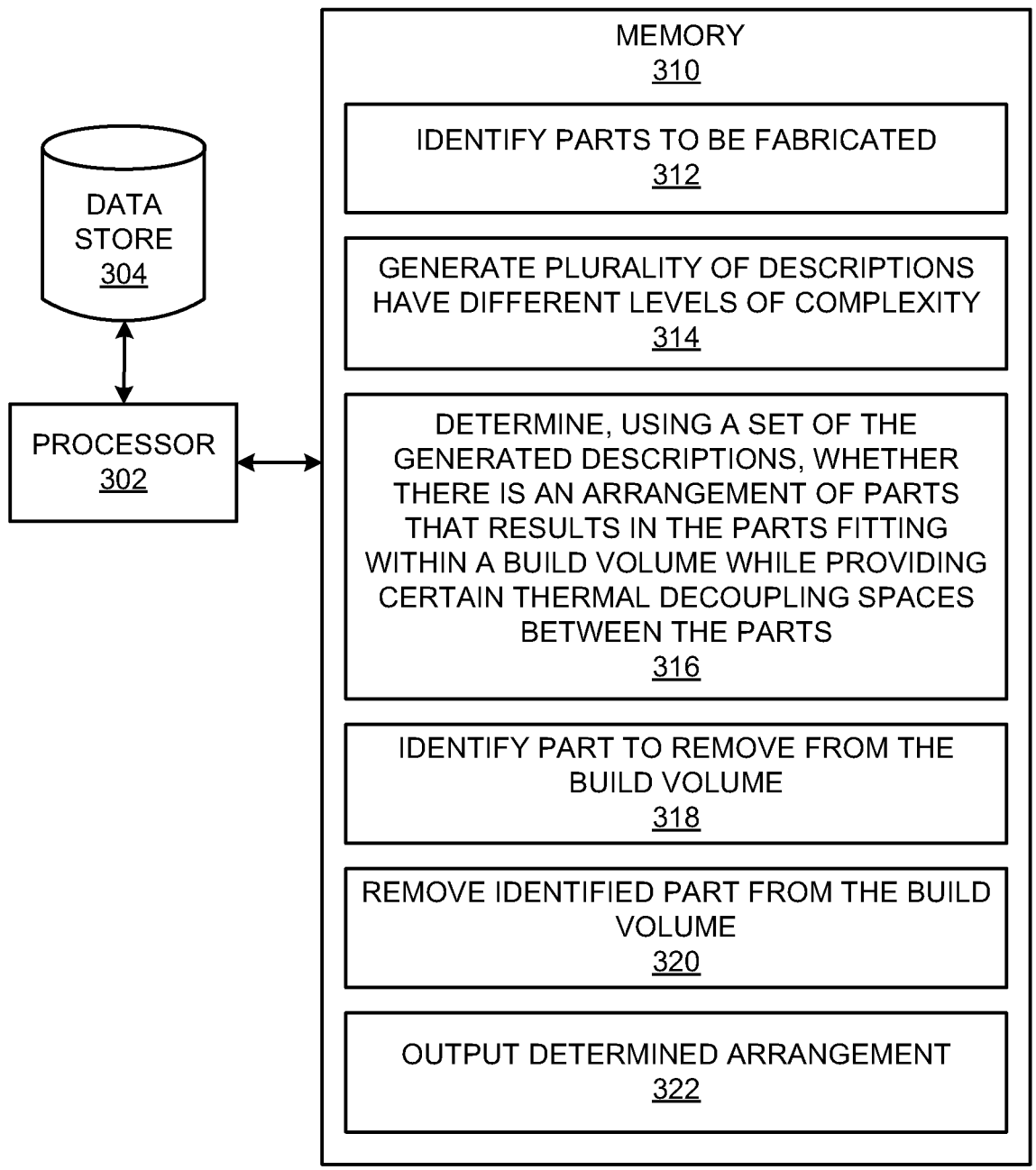
FIG. 3 shows a simplified block diagram of another example apparatus.

Turning now to FIG. 3, there is shown a simplified block diagram of another example apparatus 300. The apparatus 300 may be equivalent to the apparatus 100 and may include a processor 302 and a memory 310. The processor 302 may be equivalent to the processor 102 and the memory 310 may be equivalent to the memory 110 depicted in FIG. 1 and thus, detailed descriptions of the apparatus 300, the processor 302, and the memory 310 are not provided herein. The apparatus 300 may also include a data store 304 on which the processor 302 may store information, such as information pertaining to the parts 204-208 to be fabricated. The data store 304 may be volatile and/or non-volatile memory, such as DRAM, EEPROM, MRAM, phase change RAM (PCRAM), memristor, flash memory, and the like.

The apparatus 300 may further include an input/output interface (not shown), which may include hardware and/or software to enable the processor 302 to communicate with an external device or external devices. The input/output interface may enable a wired or wireless connection to the external device(s). The input/output interface may further include a network interface card and/or may also include hardware and/or software to enable the processor 302 to communicate with various input and/or output devices, such as a keyboard, a mouse, a display, another computing device, etc., through which a user may input instructions into the apparatus 300.

The memory 310 may have stored thereon machine readable instructions 312-322 (which may also be termed computer readable instructions) that the processor 302 may execute. The memory 310, which may also be referred to as a computer readable storage medium, may be a non-transitory machine-readable storage medium, where the term "non-transitory" does not encompass transitory propagating signals.

With reference to FIGS. 2 and 3, the processor 302 may fetch, decode, and execute the instructions 312 to identify parts 204-208 that a 3D fabricating device 200 is to fabricate. The processor 302 may identify the parts 204-208 from data pertaining to the parts 204-208 stored in the data store 304, from data received from a user, etc. The processor 302 may also fetch, decode, and execute the instructions 314 to generate, for each of the identified parts 204-208, a plurality of descriptions having different levels of complexity. That is, the processor 302 may generate, for each of the identified parts 204-208, a first level description, a second level description, a third level description, etc., in which the complexities of the descriptions increases with the increasing level. For instance, the first level descriptions are less complex than the second level descriptions for the same parts. As discussed above, the different levels of descriptions may have different amounts of data points and may thus require different amounts of processing resources.

The processor 302 may fetch, decode, and execute the instructions 316 to determine, using a set of the plurality of descriptions, whether there is an arrangement of the parts 204-208 that results in the parts 204-208 fitting within the build volume 310 of the 3D fabricating device 200 while providing certain thermal decoupling spaces between the parts 204-208. That is, the processor 302 may determine, using the first level descriptions whether such an arrangement is possible. In response to a determination that such an arrangement has been determined using the first level descriptions, the processor 302 may identify the determined arrangement as the arrangement to be used in fabricating the parts 204-208. However, in response to a determination that such an arrangement has not been determined using the first level descriptions, the processor 302 may execute the instructions 316 to determine, using the second level descriptions whether such an arrangement is possible. The processor 302 may execute the instructions 316 to determine whether such an arrangement has been determined using higher level descriptions of the parts 204-208 in response to a determination that using the second level descriptions did not result in the determination of such an arrangement. The processor 302 may execute the optimization operations discussed above in making these determinations.

That is, in response to a determination that the arrangement of the parts 204-208 that results in the parts fitting concurrently within the build envelope 210 while providing the certain thermal decoupling spaces between the parts 204-208 using the second level descriptions for the parts 204-208 has not been determined, the processor 302 may fetch, decode, and execute the instructions 316. Particularly, the processor 302 may execute the instructions 316 to determine, using the third level descriptions, whether there is an arrangement of the parts 204-208 that results in the parts 204-208 fitting concurrently within the build envelope 210 while providing the certain thermal decoupling spaces between the parts 204-208.

The processor 302 may implement an optimization operation to determine, using the third level descriptions, whether there is an arrangement of the parts 204-208 that results in the parts 204-208 fitting concurrently within the build envelope 210 while providing the certain thermal decoupling spaces between the parts 204-208. The optimization operation may include determining whether there is an arrangement of the smoothed versions of the computer aided designs of the parts 204-208 that results in each of the parts 204-208 fitting jointly within the build envelope 210 with the parts 204-208 being spaced apart from each other with sufficient distances to provide the certain thermal decoupling spaces. This may include determining whether such an arrangement exists with variously positioned and oriented versions of the smoothed versions of the computer aided designs of the parts 204-208. By way example, the processor 302 may implement a genetic algorithm to fit the smoothed versions of the computer aided designs of the parts 204-208 in the build envelope 210 in the manners discussed above.

In response to a determination that the arrangement of the parts 204-208 that results in the parts fitting within the build envelope 210 while providing the certain thermal decoupling spaces between the parts 204-208 using the third level descriptions for the parts 204-208 has been determined, the processor 302 may determine the arrangement of the parts 204-208 to be the determined arrangement of the parts 204-208.

In response to a determination that the arrangement of the parts 204-208 that results in the parts fitting concurrently within the build envelope 210 while providing the certain thermal decoupling spaces between the parts 204-208 using the third level descriptions for the parts 204-208 has not been determined, the processor 302 may fetch, decode, and execute the instructions 316. Particularly, the processor 302 may execute the instructions 316 to determine, using the fourth level descriptions, whether there is an arrangement of the parts 204-208 that results in the parts 204-208 fitting concurrently within the build envelope 210 while providing the certain thermal decoupling spaces between the parts 204-208.

The processor 302 may implement an optimization operation to determine, using the fourth level descriptions, whether there is an arrangement of the parts 204-208 that results in the parts 204-208 fitting concurrently within the build envelope 210 while providing the certain thermal decoupling spaces between the parts 204-208. The optimization operation may include determining whether there is an arrangement of the computer aided designs of the parts 204-208 that results in each of the parts 204-208 fitting jointly within the build envelope 210 with the parts 204-208 being spaced apart from each other with sufficient distances to provide the certain thermal decoupling spaces. This may include determining whether such an arrangement exists with variously positioned and oriented versions of the computer aided designs of the parts 204-208. By way example, the processor 302 may implement a genetic algorithm to fit the computer aided designs of the parts 204-208 in the build envelope 210 in the manners discussed above.

In response to a determination that the arrangement of the parts 204-208 that results in the parts fitting jointly within the build envelope 210 while providing the certain thermal decoupling spaces between the parts 204-208 using the fourth level descriptions for the parts 204-208 has been determined, the processor 102 may determine the arrangement of the parts 204-208 to be the determined arrangement of the parts 204-208.

In response to a determination that such an arrangement of parts 204-208 has not been determined through use of any of the sets of descriptions, the processor 302 may fetch, decode, and execute the instructions 318 to identify a part 204-208 to be removed from the build envelope 210. That is, the processor 302 may calculate the most likely part or parts to be removed to allow the remaining parts to fit within the build envelope 210 while maintaining the certain thermal decoupling spaces between the remaining parts. According to an example, the processor 302 may determine xspan+yspan+zspan of each of the parts, in which span is the distance across an object in a given coordinate. The processor 302 may select in the part having the largest value of xspan+yspan+zspan as the likeliest candidate for removal. However, in instances in which the fit of the parts is very close, the processor 302 may match the selected part with the volume overflow for the full set of parts. In an example in which the total volume of the parts is 7% greater than the volume of the build envelope 210 and the parts are 30%, 25%, 15%, 12%, 11%, 8% and 6% of the total volume, which sums to 107%, 107% of the volume of the build envelope 210 is allocated and the 8% of volume piece is the smallest piece larger than the 7% volume overflow. Thus, the processor 302 may select the part corresponding to 8% of the total volume as the part to be selected to be removed.

The processor 302 may fetch, decode, and execute the instructions 320 to remove the part or parts identified to be removed from the build volume 210. The processor 102 may also execute the instructions 316 to determine an arrangement of the remaining parts that results in the remaining parts fitting within the build envelope 210 while maintaining the certain thermal decoupling spaces between the remaining parts. If necessary, the processor 302 may remove an additional part or parts from the build envelope 210 to find an arrangement that results in the remaining parts fitting jointly within the build envelope 210 while maintaining the certain thermal decoupling spaces.

The processor 302 may fetch, decode, and execute the instructions 322 to output the determined arrangement of the parts 204-208 that results in the parts 204-208 fitting within the build envelope 210. Particularly, the processor 102 may store the determined arrangement in the data store 304, may output the determined arrangement to a 3D fabricating device 200, may output the determined arrangement to a separate computing device, or the like. In examples in which the apparatus 300 is part of the 3D fabricating device 200, the processor 302 may control the 3D fabricating device 200 to fabricate the parts 204-208 in the determined arrangement.

Figure 4:
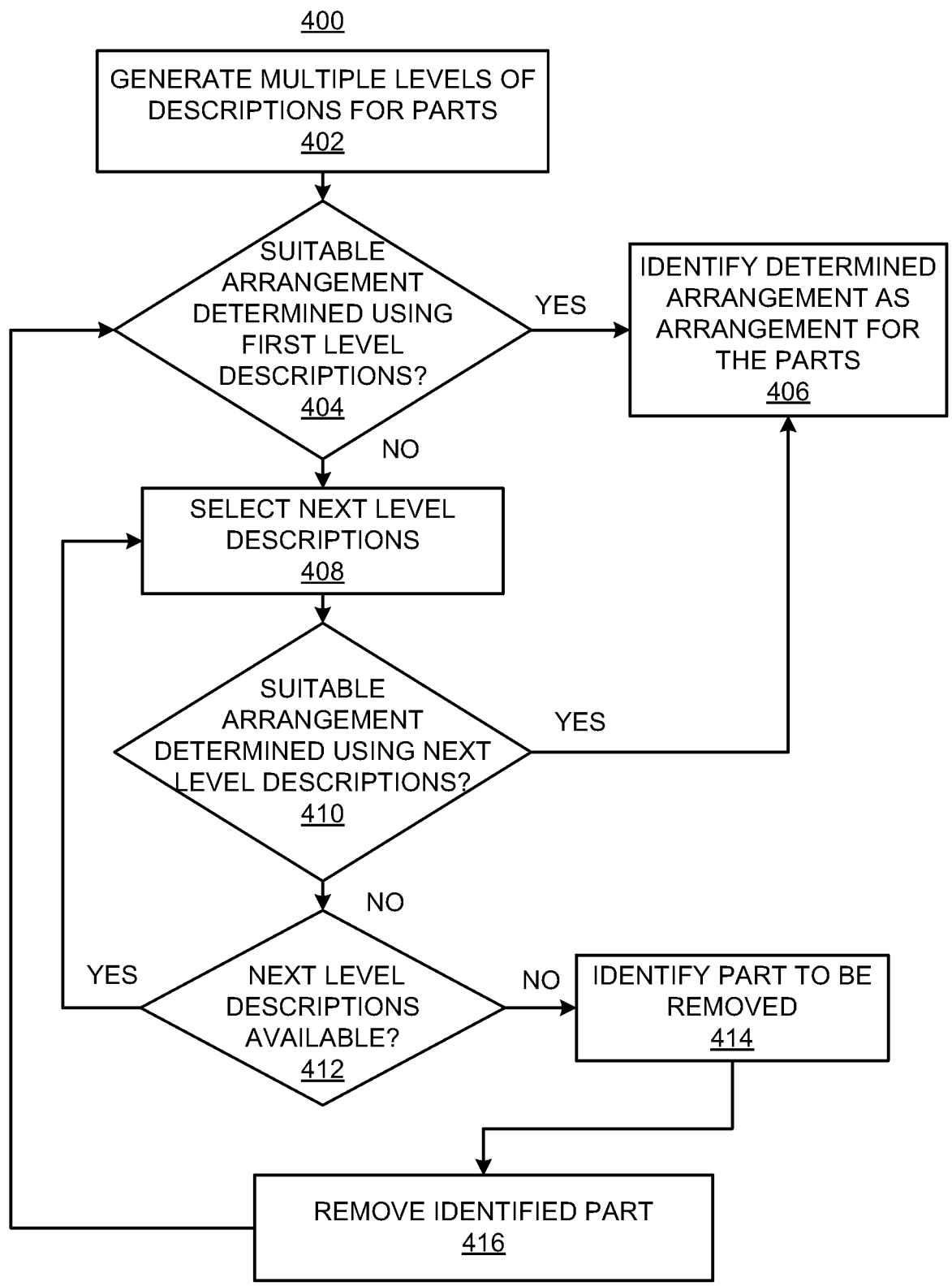
FIG. 4 shows a flow diagram of an example method for determining an arrangement of parts to be fabricated in a build envelope of a 3D fabricating device.

Various manners in which the apparatus 300 may be implemented are discussed in greater detail with respect to the method 400 depicted in FIG. 4. Particularly, FIG. 4 depicts an example method 400 for determining an arrangement of parts to be fabricated in a build envelope of a 3D fabricating device. It should be understood that the method 400 depicted in FIG. 4 may include additional operations and that some of the operations described therein may be removed and/or modified without departing from the scope of the method 400. The description of the method 400 is made with reference to the features depicted in FIGS. 2 and 3 for purposes of illustration and thus, it should be understood that the method 300 may be implemented in a 3D fabricating device 200 and an apparatus 300 having architectures different from those shown in FIGS. 2 and 3.

Generally speaking, the processor 302 of the apparatus 300 may implement or execute some or all of the instructions 312-322 stored on the memory 310 to perform the method 400. Prior to or as part of the execution of the method 400, the processor 302 may execute the instructions 312 to identify a plurality of parts 204-208 to be fabricated. For instance, the processor 302 may access information, such as computer aided design information of the plurality of parts 204-208, which may be stored in the data store 304. The computer aided design information may identify the physical characteristics of the parts, for instance, the shapes and dimensions of the parts. The processor 302 may receive or otherwise access a file containing information pertaining to the plurality of parts 204-208 from an external device, from the data store 304, or the like.

At block 402, the processor 302 may execute the instructions 314 to generate multiple levels of descriptions for each of the parts 204-208. As discussed above, the multiple levels of descriptions may have different levels of complexities with respect to each other and may thus have different amounts of data as compared with each other. As also discussed above, the multiple levels of descriptions may include first level descriptions, second level descriptions, third levels descriptions, and fourth level descriptions.

At block 404, the processor 302 may execute the instructions 316 to determine whether a suitable arrangement of parts 204-208 has been determined using the first level descriptions of the parts 204-208. That is, for instance, the processor 302 may execute the instructions 316 to determine, using the first level descriptions, whether there is an arrangement of the parts 204-208 that results in the parts fitting concurrently within the build envelope 210 of the 3D fabricating device 200 while providing certain thermal decoupling spaces between the parts 204-208. Various manners in which the processor 302 may make this determination are described in detail herein above.

In response to a determination that a suitable arrangement of the parts 204-208 has been determined using the first level descriptions, the processor 302 may execute the instructions 318 to identify the determined arrangement as the arrangement for the parts 204-208 as indicated at block 406. In other words, the processor 302 may identify the arrangement determined at block 404 as the arrangement with which the parts 204-208 are to be fabricated concurrently in the build envelope 210.

However, in response to a determination that a suitable arrangement of the parts 204-208 has not been determined using the first level descriptions, the processor 302 may select the next level descriptions at block 408. For instance, following use of the first level descriptions, the processor 302 may select the second level descriptions. In addition, at block 410, the processor 302 may execute the instructions 316 to determine whether a suitable arrangement of parts 204-208 has been determined using the next level descriptions of the parts 204-208. That is, for instance, the processor 302 may execute the instructions 316 to determine, using the second level descriptions, whether there is an arrangement of the parts 204-208 that results in the parts fitting jointly within the build envelope 210 of the 3D fabricating device 200 while providing certain thermal decoupling spaces between the parts 204-208. Various manners in which the processor 302 may make this determination are described in detail herein above.

In response to a determination that a suitable arrangement of the parts 204-208 has been determined using the next level descriptions, the processor 302 may identify the determined arrangement as the arrangement for the parts 204-208, as indicated at block 406. In other words, the processor 302 may identify the arrangement determined at block 410 as the arrangement with which the parts 204-208 are to be fabricated jointly in the build envelope 210.

However, in response to a determination that a suitable arrangement of the parts 204-208 has not been determined at block 410, the processor 302 may determine whether next level descriptions are available at block 412. In other words, the processor 302 may determine whether the determination at block 410 has been made using all of the available descriptions. In response to a determination that next level descriptions are available, the processor 302 may select the next level descriptions, e.g., third level descriptions, at block 408 and may determine whether a suitable arrangement of the parts 204-208 has been determined at block 410 using the next level descriptions. The processor 302 may repeat blocks 406-412 until the processor 302 determines at block 412 that next level descriptions are unavailable following the "no" condition at block 410.

At block 414, following a determination that next level descriptions are not available at block 412, the processor 302 may execute the instructions 318 to identify a part to be removed from the set of parts to be jointly fabricated in the build envelope 210. The processor 302 may identify the part to be removed by calculating the most likely part to be removed that allows the remaining parts to fit within the build envelope 210 while maintaining the certain thermal decoupling spaces between the remaining parts. The processor 302 may additionally identify multiple parts to be removed through the calculation. In one example, the processor 302 may identify the least number of parts to be removed from the set of parts that results in the remaining parts fitting within the build envelope while maintaining the certain thermal decoupling spaces between the remaining parts. Thus, for instance, the most likely part to be removed may be the part that, if removed, minimizes the number of parts that are required to be removed to maximize the number of parts to be fabricated concurrently while meeting the certain thermal decoupling spaces between the remaining parts.

At block 416, the processor 302 may execute the instructions 302 to remove the part or parts identified at block 414 to be removed. That is, the processor 302 may remove the identified part or parts from consideration in the determination of the arrangement of the parts 204-206. In addition, the processor 302 may repeat blocks 404-416 until an arrangement of the parts 204-208 that maximizes a number of parts fitting within the build envelope 210 while providing the certain decoupling spaces between the parts 204-208 is identified at block 406.

Although not shown in FIG. 4, the processor 302 may execute the instructions 322 to output the determined arrangement identified at block 406. Particularly, the processor 302 may store the determined arrangement in the data store 304, may output the determined arrangement to a 3D fabricating device 200, may output the determined arrangement to a separate computing device, or the like. In examples in which the apparatus 300 is part of the 3D fabricating device 200, the processor 302 may control the 3D fabricating device 200 to fabricate the parts 204-208 in the determined arrangement.

Some or all of the operations set forth in the method 400 may be contained as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored instructions that, when executed by the processor, cause the processor to:
identify a plurality of parts to be fabricated together in a build envelope of a three-dimensional (3D) fabricating device;
generate first level descriptions and second level descriptions for each of the plurality of parts, wherein the first level descriptions are less complex than the second level descriptions for the same parts;
determine, using the first level descriptions for the plurality of parts and without using the second level descriptions, whether there is an arrangement of the plurality of parts that results in the plurality of parts jointly fitting within the build envelope while providing certain thermal decoupling spaces between the plurality of parts, by continuing adding the plurality of parts into the build envelope along an x-axis of the build envelope, then along a y-axis of the build envelope, and then along a z-axis of the build envelope;

in response to a determination that the arrangement using the first level descriptions for the plurality of parts has not been determined, determine, using the second level descriptions for the plurality of parts, whether there is an arrangement of the plurality of parts that results in the plurality of parts jointly fitting within the build envelope while providing the certain thermal decoupling spaces between the plurality of parts, by continuing adding the plurality of parts into the build envelope along the x-axis, then along the y-axis, and then along the z-axis of the build envelope; and in response to a determination that the arrangement using the first level descriptions or using the second level descriptions for the plurality of parts has been determined, fabricate the plurality of parts according to the arrangement using the 3D fabrication device.

2. The apparatus according to claim 1, wherein the instructions are further to cause the processor to:

generate, for each of the plurality of parts, third level descriptions for the plurality of parts, wherein the third level descriptions are more complex than the second level descriptions for the same parts; and in response to a determination that the arrangement using the second level descriptions for the plurality of parts has not been determined, determine, using the third level descriptions, whether there is an arrangement of the plurality of parts that results in the plurality of parts jointly fitting within the build envelope while providing the certain thermal decoupling spaces between the plurality of parts.

3. The apparatus according to claim 2, wherein the instructions are further to cause the processor to:

generate, for each of the plurality of parts, fourth level descriptions for the plurality of parts, wherein the fourth level descriptions are more complex than the third level descriptions for the same parts; and in response to a determination that the arrangement using the third level descriptions has not been determined, determine, using the fourth level descriptions, whether there is an arrangement of the plurality of parts that results in the plurality of parts jointly fitting within the build envelope while providing the certain thermal decoupling spaces between the plurality of parts.

4. The apparatus according to claim 3, wherein the instructions are further to cause the processor to:

identify the arrangement of the plurality of parts that results in the plurality of parts jointly fitting within the build envelope while providing the certain thermal decoupling spaces between the plurality of parts using the third level descriptions or the fourth level descriptions; and output the identified arrangement.

5. The apparatus according to claim 4, wherein the instructions are further to cause the processor to:

instruct the 3D fabricating device to fabricate the plurality of parts according to the identified arrangement of the plurality of parts according to the third level descriptions or the fourth level descriptions.

6. The apparatus according to claim 3, wherein to determine whether there is an arrangement of the plurality of parts that results in the plurality of parts jointly fitting within the build envelope while providing the certain thermal decoupling spaces between the plurality of parts using the first level descriptions, the second level descriptions, the third level descriptions, or the fourth level descriptions, the instructions are further to cause the processor to implement an optimization operation to vary positions and orientations of the plurality of parts using the first level descriptions, the second level descriptions, the third level descriptions, or the fourth level descriptions.

7. A method comprising:

identifying, by a processor, a plurality of parts to be fabricated together in a build envelope of a three-dimensional (3D) fabricating device;

generating, by the processor, first level descriptions and second level descriptions for each of the plurality of parts, wherein each of the first level descriptions is a description of a cuboid bounding box of a respective part and each of the second level descriptions is a description of an ellipsoid convex hull of the respective part;

determining, by the processor, using the first level descriptions for the plurality of parts and without using the second level descriptions, whether there is an arrangement of the plurality of parts that results in the plurality of parts fitting concurrently within the build envelope while providing certain thermal decoupling spaces between the plurality of parts, by continuing adding the plurality of parts into the build envelope along an x-axis of the build envelope, then along a y-axis of the build envelope, and then along a z-axis of the build envelope;

in response to a determination that the arrangements using the first level descriptions for the plurality of parts has not been determined, determining, by the processor, using the second level descriptions, whether there is an arrangement of the plurality of parts that results in the parts fitting concurrently within the build envelope while providing the certain thermal decoupling spaces between the plurality of parts, by continuing adding the plurality of parts into the build envelope along the x-axis, then along the y-axis, and then along the z-axis of the build envelope; and in response to a determination that the arrangement using the first level descriptions or using the second level descriptions for the plurality of parts has been determined, fabricating using the 3D fabrication device, the plurality of parts according to the arrangement.

8. The method according to claim 7, further comprising:

generating, for each of the plurality of parts, third level descriptions for the plurality of parts, wherein each of the third level descriptions is a description of a smoothed version of a computer aided design of the respective part; and in response to a determination that the arrangement using the second level descriptions has not been determined, determining, using the third level descriptions, whether there is an arrangement of the plurality of parts that results in the plurality of parts fitting concurrently within the build envelope while providing the certain thermal decoupling spaces between the plurality of parts.

9. The method according to claim 8, further comprising:

generating, for each of the plurality of parts, fourth level descriptions for the plurality of parts, wherein each of the fourth level descriptions is a description of an original computer aided design of the respective part; and in response to a determination that the arrangement using the third level descriptions has not been determined, determining, using the fourth level descriptions, whether there is an arrangement of the plurality of parts that results in the plurality of parts fitting concurrently within the build envelope while providing the certain thermal decoupling spaces between the plurality of parts.

10. The method according to claim 9, further comprising:
in response to a determination that the arrangement using the third level descriptions has been determined, instructing the 3D fabricating device to fabricate the plurality of parts based upon the arrangement determined using the third level descriptions; and
in response to a determination that the arrangement using the fourth level descriptions has been determined, instructing the 3D fabricating device to fabricate the plurality of parts based upon the arrangement determined using the fourth level descriptions.

11. The method according to claim 9, further comprising:
in response to a determination that the arrangement using the fourth level descriptions has not been determined, identifying a part of the plurality of parts to be removed from fitting concurrently in the build envelope; and
removing the identified part from being included in the build envelope to reduce a number of parts to be fabricated in the build envelope; and
determining, using the first level descriptions and without using the second level descriptions, whether an arrangement of the reduced number of parts results in the reduced number of parts fitting concurrently within the build envelope while providing the certain thermal decoupling spaces between the reduced number of parts.

12. The method according to claim 9, wherein determining whether there is an arrangement of the plurality of parts that results in the plurality of parts fitting concurrently within the build envelope while providing the certain decoupling spaces between the plurality of parts using the first level descriptions, the second level descriptions, the third level descriptions, or the fourth level descriptions comprises implementing an optimization operation to vary positions and orientations of the plurality of parts to determine the arrangements of the plurality of parts using the first level descriptions, the second level descriptions, the third level descriptions, or the fourth level descriptions.

13. A non-transitory computer readable storage medium on which is stored machine readable instructions that when executed by a processor, cause the processor to:

generate, for each of a plurality of parts to be fabricated jointly in a build volume of a three-dimensional (3D) fabricating device, a plurality of descriptors having different levels of complexity with respect to each other;

determine, using a first set of the plurality of descriptors having a lowest level of complexity, whether there is an arrangement of the plurality of parts that results in the plurality of parts fitting jointly within the build volume while providing certain thermal decoupling spaces between the plurality of parts, by continuing adding the plurality of parts into the build volume along an x-axis of the build volume, then along a y-axis of the build volume, and then along a z-axis of the build volume;

in response to a determination that the arrangement using the first set of the plurality of descriptors has not been determined, determine, using a second set of the plurality of descriptors having a higher level of complexity than the first set, whether there is an arrangement of the plurality of parts that results in the plurality of parts fitting jointly within the build volume while providing the certain thermal decoupling spaces between the plurality of parts, by continuing adding the plurality of parts into the build envelope along the x-axis, then along the y-axis, and then along the z-axis of the build volume; and in response to a determination that the arrangement using the first set or using the second set of the plurality of descriptors has been determined, fabricate the plurality of parts according to the arrangement using the 3D fabrication device.

14. The non-transitory computer readable storage medium according to claim 13, wherein the plurality of descriptors include first level descriptors, second level descriptors, third level descriptors, and fourth level descriptors, and wherein the first level descriptors are cuboid bounding boxes of respective parts, the second level descriptors are ellipsoid convex hulls of respective parts, the third level descriptors are smoothed versions of computer aided designs of respective parts, and the fourth level descriptors are computer aided designs of respective parts.

15. The non-transitory computer readable storage medium according to claim 13, wherein the instructions are further to cause the processor to:
implement, using a respective set of the descriptors, an optimization operation to vary positions and orientations of the plurality of parts to determine whether there is an arrangement of the plurality of parts that results in the plurality of parts fitting jointly within the build volume while providing the certain thermal decoupling spaces between the plurality of parts.

* * * * *